2,894,982

Patented July 14, 1959

2,894,982

PREPARATION OF DIESTERS OF FUMARIC ACID

Harry Greenberg and Hyman R. Lubowitz, Cincinnati, Ohio, assignors to National Distillers and Chemical Corporation, New York, N.Y., a corporation of Virginia No Drawing. Application April 24, 1956
Serial No. 580,191

7 Claims. (Cl. 260—485)

The present invention relates to an improved process for preparation of diesters of fumaric acid from fumaric acid and salts thereof. More particularly, the invention relates to a process for treatment of water-wet fumaric acid or a salt thereof, obtained as a product from fermentation of a fermentable carbohydrate-containing material by means of a fumaric acid-producing fungus, for preparation of diesters of fumaric acid in relatively high yields.

Generally speaking, the process of the present invention comprises subjecting fumaric acid, or a salt thereof in the presence of an acid to liberate the acid from the salt, to esterification reaction conditions in presence of an esterifying alcohol, with an esterification catalyst and an esterifying alcohol, with an important feature being that to obtain conversion of the fumaric acid by the process embodied herein to diesters in relatively high yields, the fumaric acid values (i.e., fumaric acid or a salt thereof) subjected to the described esterification reaction should be substantially dry, i.e., the fumaric acid values subjected to esterification should essentially be substantially devoid of an aqueous medium. Although the process embodied herein may be employed with use of water-wet fumaric acid or fumaric acid salts that are produced by other methods, it is particularly adapted for use in preparation of diesters of fumaric acid in high yields from processes in which the fumaric acid or its salts are obtained by fermentation in an aqueous medium of a fermentable carbohydrate-containing substance by means of fumaric acid-producing fungi. As is described more fully hereinafter, the invention embodied herein provides a method for the direct production of diesters of fumaric acid in high yields from wet fumaric acid values by initial removal of water from the material to be esterified followed by addition of the esterification catalyst to the substantially dry fumaric acid-containing material in presence of an esterifying alcohol and subjection of the resulting mixture to esterification reaction conditions. In a preferred embodiment, the process embodied herein is carried out by subjecting the water-wet material, fumaric acid or a salt thereof, to be esterified to an elevated temperature in presence of an alcohol and an inert liquid hydrocarbon that forms an azeotrope with said alcohol and water. The heating is carried out at a temperature and for a period of time sufficient to azeotropically remove the water from the water-wet material and, in preferred practice, the heating is carried out by allowing the azeotrope to stratify, and return of the organic layer (alcohol and inert liquid hydrocarbon) to the mixture. In this manner, when the water has been substantially removed, an acidic esterification catalyst is then added to the mixture and the latter is subjected to esterification. When the material to be esterified is a salt of fumaric acid, and following removal of the water therefrom, an acid is added in an amount sufficient to liberate fumaric acid from its salt. In preferred practice, the liberation of the free fumaric acid is affected by use of an acid that also serves as an esterification catalyst, in which case the mount of acid added is in an amount sufficient to liberate the fumaric acid and to provide an excess of acid sufficient to serve as an esterification catalyst. Similarly, the wet material to be esterified may be dried and esterified by mixing the wet material with a suitable alcohol, in an amount in excess of that theoretically sufficient to convert the fumaric acid content to diesters, and an inert liquid hydrocarbon as aforedefined, subjecting the mixture to an elevated temperature whereby the water is removed as an azeotrope with alcohol and hydrocarbon, separating the water from the azeotrop, returning the organic constituents of the azeotrope to the mixture and, when substantially all of the water has been removed, adding an acidic esterification catalyst to the mixture and maintaining the resulting mixture under esterification conditions until a substantial amount of the fumaric acid content of the mixture is converted to diesters of the alcohol employed. In the case of use of wet salts of fumaric acid, the free fumaric acid is liberated, following removal of the water, by addition of an acid which, as aforesaid, may be the same material to serve as the catalyst.

Studies carried out for preparation of diesters of fumaric acid by use, as fumaric acid values, of wet fumaric acid or wet salts thereof, such as wet calcium fumarate, have resulted in yields of diesters of fumaric acid substantially less than the theoretical amount based on the fumaric acid values subjected to esterification. For example, in the preparation of fumaric acid or a fumaric acid salt by fermentation of a carbohydrate-containing material with a fumaric acid-producing fungus, the acid or its salt is obtained as a product wet with an aqueous medium due to the process having been carried out in an aqueous medium. When the product obtained from such a fermentation process is wet fumaric acid, the wet acid may be mixed with a suitable alcohol and an esterification catalyst (e.g., sulfuric acid) and the mixture subjected to conventional esterification reaction conditions. In instances wherein the product of the fermentation process is a salt of fumaric acid, e.g., calcium fumarate, the wet fumarate may be acidified with a suitable acid (e.g., sulfuric acid) to liberate the fumaric acid with formation of calcium sulfate, and the acidified mixture, in presence of a suitable alcohol and esterification catalyst, may then be subjected to conventional esterification reaction conditions. In studies carried out with such methods for producing diesters of fumaric acid from wet fumaric acid values, it has been found that the amount of diester obtained is substantially less than the theoretical amount based on the amount of fumaric acid values subjected to the esterification reaction. For example, in studies carried out with wet fumaric acid or wet calcium fumarate, and subjection thereof to conventional esterification reaction in the presence of excess alcohol and an esterification catalyst, relatively low yields of the diester of fumaric acid, on the order of 70% of theory or less have been obtained. Accordingly, and with particular reference to processes in which fumaric acid or its salts are obtained as products wet with an aqueous medium, and it is desired to prepare diesters of the fumaric acid values, conventional methods for esterification of the wet acid values have been found to fall far short of providing substantially complete conversion to diesters of fumaric acid. Hence, in its specific application to esterification of fumaric acid values obtained in wet form from fumaric acid producing processes, an essential feature of the process as defined herein is that the fumaric acid values must be substantially dry prior to subjection thereof to esterification in the presence of an esterification catalyst.

Since the process embodied herein is particularly applicable for use to obtain high yields of diesters of fumaric acid from processes wherein fumaric acid values are obtained in wet form, and as such wet fumaric acid values are obtained from fermentation of carbohydrates by means of fumaric acid-producing fungi in an aqueous medium, the invention is described more fully hereinafter with use, for illustrative purposes, of fumaric acid values obtained by such a fermentation process.

It is known that fumaric acid can be produced from a variety of carbohydrate-containing substances by means of certain fungi; for example, in Patent No. 2,327,191 and 2,326,896 processes are disclosed whereby fermentable carbohydrate solutions containing suitable nutrient materials are fermented by fumaric acid-producing fungi to produce fumaric acid or, when carried out in the presence of a suitable neutralization agent, to produce salts of fumaric acid. As disclosed therein, fungi belonging to the genus Rhizopus, including *Rhizopus nigricans*, are useful for such a purpose as are certain other organisms belonging to the order Mucorales such as species of Mucor, Cunninghamella and Circinella. Still other fungi contemplated for such usage include some fumaric acid-producing Aspergilli and other strains belonging to the genus Rhizopus and including *Rhizopus oryzae* and *Rhizopus arrhizus*. Thus, it is known that numerous fungi possess the capacity to form fumaric acid by fermentation of carbohydrate solutions whereby, as used herein, the term "fumaric acid-producing fungi" is intended to include fumaric acid-producing organisms as set forth hereinbefore as well as other organisms which, though not specifically referred to herein, also possess the capacity to produce fumaric acid by fermentation of a variety of fermentable carbohydrate-containing substances including sugars, starches and their derivatives; more specifically, glucose, fructose, sucrose, invert sugar, maltose, invert high test molasses, syrups, and various starches, grains, malted grains, cereal products and other materials containing any of the foregoing substances.

In carrying out the process for fermentation of fermentable carbohydrates by means of fumaric acid-producing fungi, the fermentation (i.e., the fumaric acid production stage) is carried out in the presence of suitable nutrient materials and, if necessary or otherwise desired, in presence of other materials and illustrative of which are salts of iron to stimulate the production of fumaric acid. For example, and for use as nutrients in the fumaric acid production stage, salts of potassium, salts of magnesium and nitrogen-containing substances may suitably be employed in various combinations and concentrations with a typical nutrient composition being composed of potassium acid phosphate, magnesium sulfate and ammonium sulfate. With respect to the nitrogen-containing nutrient, ammonium sulfate is particularly suitable but other nitrogen-containing substances may be employed and illustrative of which are urea, ammonium nitrate, ammonium chloride, aqueous ammonia, and the like.

In order to illustrate practice of the invention, a specific embodiment thereof is set forth hereinafter to illustrate its application to preparation of diesters of fumaric acid from a Rhizopus fermentation beer containing fumaric acid in the form of solid calcium fumarate and dissolved calcium fumarate and from which, unless the dissolved calcium fumarate is utilized, lower yields of esters of fumaric acid than anticipated are obtained. Hence, the Rhizopus fermentation beer is filtered to obtain a filtrate containing dissolved calcium fumarate, unfermented sugars and soluble salts and a filter cake comprising calcium fumarate, calcium carbonate, and mycelium. The filter cake is washed with water to displace adsorbed mother liquor and to provide a calcium fumarate cake. The washings and filtrate are combined and reduced in volume by rapid evaporation to 20% of the original volume of the filtrate. Since the solution supersaturates readily no calcium fumarate precipitates out. The hot liquid concentrate is then acidified with sulfuric acid to pH of 1.5, the resulting mixture is cooled to 10° C., and filtered. The filter cake is then washed with ice water to displace adsorbed mother liquor, and well drained to produce a wet fumaric acid cake comprising fumaric acid and calcium sulfate. The calcium fumarate cake obtained as aforedescribed by filtration of the fermentation beer, and the wet fumaric acid cake are now combined.

Example 1

In accordance with an embodiment of this invention, the wet combined cakes obtained as aforedescribed were dispersed in butanol in an amount equivalent to the fumaric acid content of the combined cakes plus ten percent excess. Toluene (8 cc. per gram of fumaric acid) was then added to the resulting mixture which was then heated, and free water removed as a water-butanol-toluene azeotrope, vapor temperature 82° C. The distillate was allowed to stratify and the organic layer returned to the mixture which became substantially water free when the vapor temperature reached 105° C. At that point, concentrated sulfuric acid was slowly introduced into the mixture in an amount equivalent to the calcium fumarate content of the mixture plus a 2% excess to serve as an esterification catalyst whereupon the vapor temperature dropped to 82° C. and then rose to 105° C. when the esterification was substantially complete. The resulting mixture was cooled to 10° C. and filtered. The cake which resulted therefrom and comprised calcium sulfate and digested mycelium was washed with cold toluene, the filtrate and the washings were combined, and the combined liquors were distilled at reduced pressure. Dibutyl fumarate which distilled over at 138° C. to 10 mm. pressure was obtained in 96% yield as a clear, water white liquid, having a refractive index of 1.44460 at 22° C.

Example 2

For comparison purposes and to illustrate the effect upon esterification of use of wet fumaric acid as wet calcium fumarate, 225 grams of the dry calcium fumarate (fumaric acid content of 125 grams) produced as aforedescribed were suspended in water and then filtered in a sintered glass vessel. The filtered cake was allowed to drain to a wet cake weighing 520 grams. To the wet cake sufficient sulfuric acid was added to precipitate all the calcium plus 2% excess. This was then worked up in the same manner as was the dry cake in Example 1. Whereas a 96% yield based on theory of di-n-butyl fumarate was obtained in Example 1, a yield of only 70% of di-n-butyl was obtained by use of the wet calcium fumarate cake in this example.

In carrying out the esterification reaction embodied herein, the inert liquid mediums that may suitably be employed may be selected from a variety of materials that are liquid under the conditions of the esterification conditions employed and form an azeotrope with water and the alcohol. Suitable therefor are materials such as aliphatic hydrocarbons, aromatic hydrocarbons, such as xylene, benzene, toluene and the like, halogen-substituted hydrocarbons such as perchloroethylene, and others.

The esterification reaction is carried out by use of an alcohol in an amount in excess of that theoretically required to form diesters of the fumaric acid values subjected to esterification. Although the alcohol may be employed in a rather substantial excess, an excess of up to about 10% is usually satisfactory. For carrying out the esterification, any of a variety of alcohols can be used and, particularly, monohydric alcohols of the aliphatic type, such as propanol, ethanol, butanol, octanol, 2-ethylhexanol and the like, and preferably, aliphatic monohydric alcohols having from about 2 to about 12 carbon atoms.

The esterification catalyst that is employed is preferably sulfuric acid although other esterification catalysts such as phosphoric acid, p-toluene sulfonic acid, and the like may be employed. When the fumaric acid value to be esterified is in the form of a salt of fumaric acid, such for example as calcium fumarate, the esterification can be carried out, by adding the inert liquid medium and alcohol, removing water as described in Example 1, and then adding an acid, such as sulfuric acid, in an amount sufficient to liberate the free fumaric acid from its salt and provide an excess of acid to serve as the esterification catalyst. For most purposes, suitable results are obtained by use of the esterification catalyst in an amount of from about 0.1% to about 5% by weight based on the weight of the fumaric acid.

In the foregoing specific embodiments utilized for description of the invention, the fumaric acid values subjected to esterification were derived from calcium fumarate obtained by use of calcium carbonate in the fermentation process. However, practice of this invention is not limited thereto as, in addition to use of fumaric acid per se, the fumaric acid values may be in the form of potassium fumarate, sodium fumarate, and other salts, such as would result by use of neutralizing agents such as potassium hydroxide, sodium hydroxide, and the like, in preparation of fumaric acid by fermentation processes as aforedescribed.

In an embodiment of the process as embodied herein, wherein the fumaric acid or its salts are dried azeotropically, a high degree of dryness is achieved, thereby enabling the described obtainment of the fumaric acid esters in improved yield. It is not essential however, that the fumaric acid values be prepared in bone dry condition prior to addition of acid and/or acidic esterification catalyst, but it is highly desirable that substantially all of the primary free water be removed from the fumaric acid values such, for example, to the extent that a vapor temperature of about 105° C. be reached in the azeotropic removal of water in the manner of the specific embodiments aforedescribed. An important aspect of the substantial removal of the primary free water from the wet fumaric acid values is that several hours may be required for its removal azeotropically whereby, as embodied herein, the esterification is carried out with addition of the catalyst following removal of the primary free water whereby to obviate boiling the fumaric acid values and alcohol in the presence of free acid for extended periods of time which tends to enhance occurrence of undesired side reactions.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:
1. A process for preparation of diesters of fumaric acid from a water-wet fumaric acid-containing substance which comprises preparing a mixture comprising said water-wet substance, an aliphatic monohydric alcohol having from about 2 to 12 carbon atoms and an inert hydrocarbon liquid that forms an azeotrope with said alcohol and water, subjecting the resulting mixture substantially devoid of an acidic esterification catalyst to an elevated temperature sufficient to azeotropically remove water from said water-wet substance, and then subjecting the resulting substantially water-free fumaric acid-containing substance in mixture with said alcohol to esterification in the presence of sulfuric acid as an esterification catalyst added following said removal of water from said water-wet substance.

2. A process, as defined in claim 1 wherein the water-wet fumaric acid-containing substance is obtained as a product from fermentation of a fermentable carbohydrate by means of a fumaric acid-producing fungus.

3. A process for preparation of diesters of fumaric acid from a water-wet fumaric acid which comprises preparing a mixture comprising said water-wet acid, an aliphatic monohydric alcohol having from about 2 to 12 carbon atoms and an inert organic liquid that forms an azeotrope with said alcohol and water, subjecting said mixture substantially devoid of an acidic esterification catalyst to an elevated temperature to remove water from said water-wet acid as an azeotrope with said alcohol and water and, following removal of substantially all of the water from said fumaric acid, adding an acidic esterification catalyst to the resulting substantially water-free fumaric acid in mixture with said alcohol, and esterifying said fumaric acid with said alcohol in mixture therewith.

4. A process for preparation of diesters of fumaric acid from a water-wet salt of fumaric acid which comprises preparing a mixture comprising said water-wet salt of fumaric acid, an aliphatic monohydric alcohol having from about 2 to 12 carbon atoms and an inert organic liquid that forms an azeotrope with said alcohol and water, subjecting said mixture substantially devoid of an acidic esterification catalyst to an elevated temperature to remove water from said water-wet substance as an azeotrope with said alcohol and inert liquid, adding an acid to the resulting substantially water-free salt of fumaric acid in mixture with said alcohol to liberate the fumaric acid from said salt, and subjecting the resulting mixture of water-free fumaric acid and said alcohol to esterification in presence of an acidic esterification catalyst that is added following said removal of water from the water-wet salt of fumaric acid.

5. A process for preparation of a diester of fumaric acid from a water-wet salt of fumaric acid which comprises preparing a mixture comprising said water-wet salt, an aliphatic monohydric alcohol having from about 2 to 12 carbon atoms in an amount in excess of that theoretically required to convert said salt to diesters of fumaric acid, and an inert organic liquid that forms an azeotrope with said alcohol and water, subjecting said mixture to an elevated temperature to remove water from said water-wet salt as an azeotrope with said alcohol and inert liquid, separating water from said azeotrope and returning the organic liquid and alcohol constituents of said azeotrope to the salt, adding an acid to the resulting mixture of substantially water-free salt, alcohol and inert liquid in an amount sufficient to liberate fumaric acid from the salt, and subjecting the resulting mixture containing the liberated fumaric acid to esterification in presence of an acidic esterification catalyst.

6. A process, as defined in claim 5, wherein the water-wet salt of fumaric acid is obtained as a product from fermentation of a fermentable carbohydrate by means of a fumaric acid-producing fungus.

7. A process, as defined in claim 5, wherein the acid added to the mixture comprising the substantially water-free salt is sulfuric acid in an amount in excess of that theoretically required to liberate the fumaric acid from its salt to thereby provide in the mixture sulfuric acid to serve as the esterification catalyst.

References Cited in the file of this patent
UNITED STATES PATENTS
2,742,495   Nawiasky et al. _____ Apr. 17, 1956

OTHER REFERENCES
Gilman et al.: "Organic Syntheses," Coll. Vol. I, 2nd ed. 1941, pp. 261–3.
Weissberger: "Technique of Organic Chemistry," 1950, vol. III, pp. 622–3 and 633.
Groggins: "Unit Processes in Organic Synthesis," 1952, pp. 602–16.
Satta et al.: J. Am. Chem. Soc., 75, 4101 (1953).